United States Patent

Lodge

[15] 3,687,903

[45] Aug. 29, 1972

[54] SYNTHETIC POLYMERS FROM SULFO-BIS(AMINOALKYL)FLUORENE

[72] Inventor: John Ewart Lodge, ICI Fibres Limited, Pontypool, England

[22] Filed: July 7, 1970

[21] Appl. No.: 60,999

Related U.S. Application Data

[62] Division of Ser. No. 702,784, Feb. 5, 1968.

[30] Foreign Application Priority Data

Feb. 13, 1967 Great Britain............6,767/67

[52] U.S. Cl. .....................260/78 R, 8/55, 57/140 R, 260/29.2 N, 260/78 A, 260/78 L
[51] Int. Cl. ............................................C08g 20/20
[58] Field of Search....................................260/78 R

[56] References Cited

UNITED STATES PATENTS

| | | | |
|---|---|---|---|
| 3,184,436 | 5/1965 | Magat | 260/78 R |
| 3,287,321 | 11/1966 | Temin | 260/78 R |
| 3,389,172 | 6/1968 | Burrows et al. | 260/78 R |
| 3,409,596 | 11/1968 | Unger et al. | 260/78 R |
| 3,560,448 | 2/1971 | Lodge | 260/78 R |

OTHER PUBLICATIONS

Korshak–Frunze: Synthetic Hetero–Chain Polyamides, 1964, pp. 223– 224

*Primary Examiner*—Harold D. Anderson
*Attorney*—Cushman, Darby & Cushman

[57] ABSTRACT

Polyamides containing sulphofluorene links to accept basic dyestuffs (not acid) for single stage pattern dyeing.

8 Claims, No Drawings

SYNTHETIC POLYMERS FROM SULFO-BIS(AMINOALKYL)FLUORENE

This is a division of my copending application, Ser. No. 702,784, filed Feb. 5, 1968.

This invention relates to the manufacture of synthetic linear polymers and more particularly to synthetic linear copolyamides containing fluorene sulphonic acid residue in the carbon chain, and to shaped articles made therefrom.

High molecular weight synthetic linear polyamides, by which is meant polyamides of sufficiently high molecular weight to be capable of being melt spun, have long been known and some are manufactured on a large scale for melt-spinning into filaments by the polycondensation of low molecular weight diamines and dicarboxylic acids or of amino-carboxylic acids. For example, polyhexamethylene adinamide may be made by the condensation of hexamethylene diamine and adipic acid. A similar polyamide is obtainable by the polycondensation of omega-amino-caproic acid. In place of the latter the corresponding lactam, namely epsilon-caprolactam can be polymerized so as to afford a polyamide.

Such polyamides e.g. polyhexamethylene adipamide, may be melt-spun into filaments having many attractive textile properties including a high tenacity and resistance to abrasion. The filaments are commonly dyed by acid dyestuffs but basic dyestuffs can also be used though in the case of the latter is is desirable to select those possessing good fastness to light.

Much attention has been paid particularly in recent years to the problem of modifying polyamides so as to increase or decrease their dyeability, i.e., the depth of shade obtained with a given dyestuff under given conditions. The reason for the interest in this problem is as follows. If a fabric is knitted or woven or otherwise fabricated of two or more polyamides of different dyeabilities, a pattern can immediately be obtained by a single dyeing operation, which constitutes an attractive commercial proposition.

Whilst polyamides can be modified for the above purpose by the physical application or incorporation of suitable agents it is preferable that the latter be built into the polyamide chain, i.e., chemically combined therewith, because more permanent effects are thereby obtained. For example, if bifunctional compounds capable of taking part in the polyamide polycondensation and bearing, say, sulphonic acid groups, are included in the starting materials used in the manufacture of the polyamide they will form part of the linear polyamide chain and the additional sulphonic acid groups will increase the dyeability of the resulting polyamide with respect to basic dyestuffs whilst reducing the uptake of acid dyestuffs. Suitable bifunctional compounds for taking part in the aforesaid condensation reaction have, for instance, a plurality (especially two) or amino and/or carboxyl groups. Thus diamino aromatic sulphonates can be used to give polyamides dyeing more deeply with basic dyestuffs.

It has now been found that metal salts of the hitherto undisclosed sulpho-bis 9, 9-aminoalkylfluorenes are very useful for this purpose. The alkyl group may be gamma-amino-n-propyl, methyl, ethyl, isobutyl or stearyl. Instead of the amino groups functionally equivalent groups, e.g. the formylamino group may be employed.

Accordingly, therefore, from one aspect the present invention provides, as novel compounds, sulpho 9, 9-bis-aminoalkylfluorenes.

The metal salts are of monovalent metals e.g. sodium, potassium or of basic organic salts of a divalent metal e.g. calcium benzoate, calcium acetate, zinc acetate, strontium formate and stannous valerate.

According to another aspect the invention provides monovalent metal or basic organic divalent metal salts of the sulpho-9, 9-bis aminoalkylfluorene compounds referred to above.

Examples of the sulpho-bis aminoalkylfluorenes of this invention are disodium 9, 9-bis-beta-aminoethylfluorene-2, 7-disulphonate
sodium 9,-bis-beta-aminoethylfluorene-2-sulphonate
potassium 9,9-bis-beta-aminoethylfluorene-2-sulphonate
lithium 9,9-bis-gamma-aminopropylfluorene-2-sulphonate
sodium 9,-9-bis-delta-aminobutylfluorene-2-sulphonate
2-bensoyloxybariumsulpho-9,9-bis-beta-aminoethylfluorene
2,7-bis-acetoxy bariumsulpho-9,9-bis-beta-aminoethylfluorene
2,7-bis-hexanoyloxymagnesiumsulpho-9,9-bis-delta-aminobutylfluorene According to a further aspect the present invention provides filament-forming synthetic linear copolyamides consisting essentially of the polymeric condensation product of an equi-molecular mixture of an aliphatic alpha omega-diamine or cylco aliphatic diamine having from four to 20 carbon atoms and an aliphatic alpha, omega-dicarboxylic acid having from six to 22 carbon atoms, and/or an aliphatic omega-aminocarboxylic acid containing from five to 21 carbon atoms, or polyamide forming functional equivalents thereof and a 9,9-bis-omega-aminoalkylfluorene mono or di-sulphonic acid or a polyamide-forming functional derivative thereof together with approximately an equal molecular proportion of an aliphatic alpha, omega-dicarboxylic acid having from six to 22 carbon atoms, the said fluorene derivative being present in a molecular proportion with respect to the foregoing acids of from one-fourth to 10 percent.

The fluorene intermediate may be added the reagents or melt before, during or after the polyamide polymerization of polycondensation and should be employed in a molecular proportion not exceeding 10 percent so that not more than 10 percent of the repeating amide units contain fluorene nuclei. In other words the number of moles of the fluorene intermediate used must not exceed one-tenth the number of moles of dicarboxylic acid or amino-carboxylic acid employed in making the polyamide. Not less than one-fourth mol. percent of the fluorene compound should be used and the preferred proportion is one-half to 5 mol. percent.

According to yet a further aspect, therefore, this invention comprises a process for the manufacture of synthetic linear copolyamides by heating, to effect polymerization, an approximately, equimolecular mixture of an aliphatic alpha, omega-diamine or cyclo aliphatic diamine having from four to 20 carbon atoms and an aliphatic alpha, omega-dicarboxylic acid having from six to 22 carbon atoms, and/or an aliphatic omega-aminocarboxylic acid containing from five to 21 carbon atoms, or instead of said monomer a polyamide-forming functional equivalent thereof together with a molecular proportion with respect to the foregoing acids of from one-fourth to 10 percent of the monovalent metal or divalent basic organic salt of a 9,9-bis-omega-aminoalkylfluorene mono- or di-sulphonic acid or a polyamide-forming functional derivative thereof, added at any stage of the polymerization and accompanied by approximately the same molecular quantity of an aliphatic alpha, omega-dicarboxylic acid from six to twenty-two carbon atoms.

Examples of the aliphatic diamines and cycloaliphatic diamines are:
Hexamethylene diamine
3-methylhexamethylene diamine
Tetramethylene diamine
Decamethylene diamine
Octamethylene diamine
1:6-diamino-6-methylheptane
Bis (p-aminocyclohexyl) methane Examples of the aliphatic dicarboxylic acids are:-
Adipic acid
Beta-methyladipic acid
Sebacic acid
Pimelic acid
Hexadecamethylene dicarboxylic acid Suitable sulpho-bis-aminoalkylfluorenes are those hereinbefore referred to.

In place of the approximately equi-molecular mixture of the aliphatic diamine and dicarboxylic acid, there may conveniently be employed polyamide-forming functional derivatives such as the diamine-dicaroxylic acid salt derived therefrom, e.g. hexamethylene diammonium adipate (derived from hexamethylene diamine and adipic acid). Thus, for instance, a copolyamide according to the invention may be made by heating together 78.6 parts by weight of hexamethylene diammonium adipate and 3.2 part by weight of sodium 9,9-bis-beta-ammoniumethylfluorene-2-sulphonate adipate (i.e. 2 molar percent). As already mentioned the starting materials used in making the present copolyamides may be brought together in any desired order. If the salts are employed, as just mentioned, the fluorene salt can be added to the hexamethylene diammonium adipate and the two heated together either in an autoclave or a continuous polymerization apparatus in order to effect polymerisation, or the fluorene salt can be added to the reaction mixture during the polymerization of the hexamethylene diammonium adipate; alternatively the two salts can be polymerized separately by heating, and the resulting polyamides then heated together in order to bring about amide interchange and thus produce the required copolyamide. Thus a copolyamide can be made by (1) first polymerising e.g. over 10 percent of the fluorene salt monomer with, say, hexamethylene diammonium adipate, (2diammonium ) separately polymerising a further proportion of hexamethylene diammonium adipate to produce polyhexamethylene adipamide and (3) heating the two polymers together to effect interaction (amide interchange) whereby a copolyamide is obtained similar to that which would have resulted if all the hexamethylene diammoninium adipate had been heated with the fluorene salt monomer in one polymerization Other salts which may be used in conjunction with the latter starting material are:
hexamethylene diammonium sebacate
Octamethylene diammonium adipate
Pentamethylene diammonium sebacate
Dodecamethylene diammonium adipate If desired, the diamenes may be used in the form of their N-formyl derivatives or other functional polyamide-forming derivatives; also the acids may be employed in the form of their ethyl esters for example.

Likewise instead of the amino-carboxylic acids the chemically equivalent lactams derived therefrom may be employed. Examples of suitable amino-carboxylic acids and lactams are:
Epsilon-aminocaproic acid
Epsilon-caprolactam
Omega-aminoundecanoic acid
Omega-aminoheptanoic acid More than one of the aforesaid starting materials, namely, diamines, dicarboxylic acids or amino-carobxylic acids or their chemical equivalents, may be employed.

Amongst the reagents employed in making the present polyamides there may be included monofunctional compounds in small quantity, notably monoamines or monobasic acids, e.g. acetic acid, in order to prevent polymerization proceeding beyond the desired degree at elevated temperatures, for example, when the polyamide is held molten for the purpose of melt-spinning it into filaments. Such monofunctional compounds are known as viscosity stabilizers. In the case of the manufacture of a polyamide from a diamine and a dicarboxylic it is also possible to control the degree of polymerization by employing a suitable excess of the diamine or of the dicarboxylic acid. Other adjuvants may also be incorporated in the polyamides at any convenient stage of their manufacture for instance: Dystuffs, pigments, dystuff-formers, plasticizers lustrants, resins.

In the following examples which are by way of illustrating not limiting the invention the parts are parts by weight.

EXAMPLE 1

200 parts of 9,9-di(3'-aminopropyl)-fluorene dihydrochloride are added during 1 hour with stirring to 375 parts of 98 percent sulphuric acid. The solution obtained is stirred at 100°C. for 4 hours, and then poured into 1,000 parts of methanol. The white precipitate of 9,9-di(3'-aminopropyl)-fluorene 2,7-disulphonic acid is filtered off and washed with methanol until free of sulphuric acid. Found: S: 14.5%; N: 6.3%; $C_{19} H_{24} N_2 S_2 O_6$ requires S: 14.54%; N: 6.36%.

EXAMPLE 2

132.8 parts of 9,9-di-(3'-aminopropyl)-fluorene-2,7-disulphonic acid and 24.14 parts of sodium hydroxide are dissolved in 1,000 parts of water, and the solution added to an autoclave containing 8,000 parts of hexamethylene diammonium adipate, 44.1 parts of adipic acid 9.16 parts of acetic acid and 20.7 parts of titanium dioxide. The mixture is stirred and heated to 205°C. during 1 hour reaching a pressure of 250-lb./sq. in. The temperature is then raised to 240°C. during 1 hour whilst the pressure is maintained (by a spring-loaded escape valve). During the next (third) hour the pressure is allowed to fall to one atmosphere while the temperature is raised further to 275°C; the polymer is finally heated at 285°C. for 35 minutes.

The resulting white polymer which possesses a Relative Viscosity of 33.4 is melt-spun under steam to give a yarn of 20 filaments. The latter are drawn to 3.66 times their original length and then have a total denier of 70 and 30 percent extensibility at break.

The Relative Viscosity is determined by dividing the viscosity of an 8.4 percent w/w solution of the polymer in 90 percent w/w aqueous formic acid at 25 C. by the viscosity of the said aqueous formic acid at the same temperature.

The yarn on analysis proved to have 49 cm. eqts. of amine ends and 71 gm. eqts. of carboxyl ends per million gms; the relative viscosity is 34.5.

A hank of yarn is immersed for 3 hours in 200 times it weight of a 0.05 percent aqueous solution of Acid Blue No. 45 containing 1 percent of acetic acid, but is hardly stained. The amount of dyestuff taken up, equivalent dye uptake (E.D.U.), is measured by dissolving 50 mg. of the yarn in 20 ml. of 40 percent sulphuric acid and measuring the optical density at 430 m$\mu$ in a Unicam S.P. 600 spetrophotometer. The dyestuff taken up by polyhexamethylene adipamide yarn under the same conditions is 30 times as much.

At a pH of 5.6 the yarn possessed an E.D.U. of Basic Orange 28 (Color Index) 5.22 times that of polyhexamethylene adipamide yarn whilst at pH 7.0 the E.D.U. was 3.23 times that of polyhexamethylene adipamide yarn.

EXAMPLE 3

7930 parts of caprolactam, a solution of 154.7 parts of 9,9-di(3'-aminopropyl)-fluorene-2, 7-disulphonic acid 28.12 parts of sodium hydroxide in 3 liters of water, and 51.32 parts of adipic acid is added to an autoclave under an atmosphere of nitrogen. The temperature is raised during 1 hour to 220°C. and the steam pressure to 250 psig; during the next hour the temperature is raised to 270°C. and steam allowed to escape slowly reducing the pressure to 180 psig; whilst during the next hour the temperature is raised to 285°C. and the pressure allowed to fall to atmospheric. The molten polymer is held to 285°C. for 45 minutes under an atmosphere of steam before being extruded into a ribbon.

The resulting polymer has a Relative Viscosity of 30.1, an amine end group of 51.6 g./$10^6$g. and a carboxyl end group content of 54 g./$10^6$g.

This polymer is spun at 270°C. to a 20 filament yarn of 400 denier. The yarn, after drawing at a draw ratio of 3.31, has a denier of 114 and an extension at break of 40 percent.

At a pH of 3.7 the yarn possesses an E.D.U. of Acid Blue 45 (Color Index) of one-sixtieth of that of a polycaproamide yarn under similar conditions. At a pH of 3.0 the E.D.U. of the yarn to Basic Orange 28 (Color Index) was 12.5 times that of the polycaproamide yarn.

EXAMPLE 4

7,543 parts of hexamethalyne diammonium dodecamethylene dioate, a solution of 96 parts of 9, 9-di(3'-aminopropyl)-fluorene-2, 7-disulphonic acid and 17.44 parts of sodium hydroxide in 2 liters of water and 31.84 parts of adipic acid is added to an autoclave, under an atmosphere of nitrogen. Polymerization is effected as described in Example 3 to produce a white polymer having an amine end group content of 65.2 g./$10^6$g. and a carboxyl content of 54 g./$10^6$g.

This polymer is melt spun under an atmosphere of steam at 270°C. to a 20 filament yarn of 260 denier. After drawing at a draw ratio of 3.3 the yarn has a denier of 74.5 and an extension at break of 19 percent.

At a pH of 3.7 the yarn possesses an E.D.U. of Acid Blue 45 (Color Index) one twenty-eighth of polyhexamethylene dodecamethylene diamide. At a pH of 3.0 the E.D.U. of the yarn to Basic Orange 28 (Color Index) is nine times that of the polyhexamethylene dodecamethylene diamide yarn.

What I claim is:

1. A synthetic linear filament-forming copolyamide consisting essentially of the polymeric condensation product of an equimolar mixture of an aliphatic alpha omega-diamine or cycloaliphatic diamine having from four to 20 carbon atoms and an aliphatic alpha, omega-dicarboxylic acid having from six to 22 carbon atoms, and/or an aliphatic omega-amino-carboxylic acid containing from five to 21 carbon atoms, or polyamide-forming functional equivalents thereof, and a 9,9-bis-omega-aminoalkylfluorene mono or disulphonic acid or a polyamide-forming functional derivative thereof together with an equimolecular proportion of an aliphatic alpha-omega-dicarboxylic acid having from six to 22 carbon atoms, said fluorene derivative being present in a molecular proportion of from one-fourth to 10 percent with respect to the foregoing acids.

2. A copolyamide according to claim 1 wherein the fluorene derivative is present in a molecular proportion of from one-half to 5 percent.

3. A copolyamide according to claim 1 wherein the fluorene dicarboxylic acid is in the form of a salt of a monovalent metal selected from the group consisting of sodium and potassium or of a salt of basic organic divalent metal selected from the group consisting of calcium benzoate, calcium acetate, zinc acetate, strontium formate and stannous valerate.

4. A copolyamide according to claim 3 wherein the monovalent

5. A copolyamide according to claim 3 wherein the basic metal is sodium or potassium. divalent metal is calcium benzoate, calcium acetate, zinc acetate, strontium formate or stannous valerate.

6. A copolyamide according to claim 1 wherein the first mentioned diamine is hexamethylene diamine and the dicarboxylic acid adipic acid or alpha-omega-dodecamethylene dicarboxylic acid.

7. A polyamide according to claim 1 wherein the omega-aminocarboxylic acid polyamide-forming functional derivative is caprolactam.

8. A copolyamide according to claim 1 wherein the 9,9-ibs-omega-aminoalkylfluorene sulphonic acid is 9,9-bis-gamma-amino-n-propyl fluorene 2,7-disulphonic acid.

* * * * *